(12) United States Patent
Song et al.

(10) Patent No.: US 9,055,286 B2
(45) Date of Patent: Jun. 9, 2015

(54) AUTOSTEREOSCOPIC DISPLAY METHOD AND SYSTEM

(71) Applicant: SuperD Co. Ltd., Shenzhen (CN)

(72) Inventors: Lei Song, Shenzhen (CN); Ning Liu, Shenzhen (CN); Zhang Ge, Shenzhen (CN)

(73) Assignee: SUPERD CO. LTD., Shenzhen (CN)

( * ) Notice: Subject to any disclaimer, the term of this patent is extended or adjusted under 35 U.S.C. 154(b) by 304 days.

(21) Appl. No.: 13/872,291

(22) Filed: Apr. 29, 2013

(65) Prior Publication Data
US 2014/0313296 A1    Oct. 23, 2014

(30) Foreign Application Priority Data

Apr. 18, 2013  (CN) .......................... 2013 1 0136018

(51) Int. Cl.
*H04N 13/04*    (2006.01)
(52) U.S. Cl.
CPC ................................ *H04N 13/0402* (2013.01)
(58) Field of Classification Search
CPC .......... H04N 13/0402; H04N 13/0404; H04N 13/0406; H04N 13/0409; H04N 13/0415; H04N 13/0022; H04N 13/0413; H04N 13/0411; G09G 2320/0209; G02B 27/2214; G02B 27/225
USPC ............ 348/42, 54–60, 51, 52; 345/419, 653, 345/664, 679; 382/154
IPC ............................................. H04N 13/04,13/00
See application file for complete search history.

(56) References Cited

U.S. PATENT DOCUMENTS

2013/0033583 A1*  2/2013  Lee et al. ......................... 348/54
2014/0063015 A1*  3/2014  Cho et al. ....................... 345/426

* cited by examiner

*Primary Examiner* — Sherrie Hsia
(74) *Attorney, Agent, or Firm* — Anova Law Group, PLLC (57) ABSTRACT

A method is disclosed for a stereoscopic display system. The display system has a display panel containing an array of display units and a plurality of stereoscopic devices coupled to the display panel to affect three-dimensional (3D) display. The method includes receiving a 3D image to be displayed on the array of display units. The method also includes determining original display values for the display units and determining a coupling relationship between the display units and the stereoscopic devices. Further, the method includes determining a crosstalk condition based on the coupling relationship, and adjusting the original display values of display units based on the coupling relationship, the crosstalk condition, and the original display values of both the left display units and the right display units such that the crosstalk condition is cancelled. The method also includes displaying the 3D image using the adjusted display values of the display units.

20 Claims, 6 Drawing Sheets

AUTOSTEREOSCOPIC DISPLAY METHOD AND SYSTEM

CROSS-REFERENCES TO RELATED APPLICATIONS

This application claims the priority of Chinese patent application number 201310136018.x, filed on Apr. 18, 2013, the entire contents of which are incorporated herein by reference.

FIELD OF THE INVENTION

The present invention generally relates to three-dimensional (3D) display technologies and, more particularly, to the methods and systems for processing and displaying 3D images.

BACKGROUND

A person's left eye and right eye are in different horizontal positions separated by a small distance, resulting in two slightly different retinal images viewed by the person's left eye and right eye. The disparity between the different retinal images, observations of scenes from the left eye and the right eye, is called parallax. The human brain processes the different retinal images with the parallax to form a stereoscopic image.

Certain stereoscopic display technologies are based on such parallax concept. Conventional stereoscopic display devices often require viewers to wear three-dimensional (3D) glasses for viewing different images with parallax. However, if a viewer is already wearing another type of glasses (such as glasses to correct near-sightedness or far-sightedness), the viewer needs to put on two pairs of glasses overlapping each other in order to watch the stereoscopic display, which makes it inconvenient for the viewer. In addition, a pair of 3D glasses usually have a fixed width between two legs of the glasses, and thus do not always fit all viewers. This may cause undesired viewing experience for certain viewers. Therefore, autostereoscopic display systems, which do not require viewers to wear 3D glasses in order to view 3D images, are attracting more and more people's attention.

The autostereoscopic display technology often uses a stereoscopic or light separation device, such as a lenticular-lens device, placed over a display to display 3D images. However, the light separation device is often unable to completely separate images for the left eye and images for the right eye, which may cause some of the left image seen by the right eye and some of the right image seen by the left eye. Such crosstalk may result in the "ghost" phenomenon.

The crosstalk or ghost phenomenon may be reduced or partially eliminated by using the more sophisticated optical design and process technology. However, the cost may be increased significantly. The disclosed methods and systems are directed to solve one or more problems set forth above and other problems.

BRIEF SUMMARY OF THE DISCLOSURE

One aspect of the present disclosure includes a method for a stereoscopic display system, which has a display panel containing an array of display units and a plurality of stereoscopic devices coupled to the display panel to affect three-dimensional (3D) display. The method includes receiving a 3D image to be displayed on the array of display units. The 3D image contains a left image and a right image and the display units contain left display units for the left image and right display units for the right image. The method also includes determining original display values for the display units to display the 3D image, and determining a coupling relationship between the display units and the stereoscopic devices. Further, the method includes determining a crosstalk condition based on the coupling relationship between the display units and the stereoscopic devices, and adjusting the original display values of display units based on the coupling relationship, the crosstalk condition, and the original display values of both the left display units and the right display units such that the crosstalk condition is cancelled. The method also includes displaying the 3D image using the adjusted display values of the display units.

Another aspect of the present disclosure includes a stereoscopic display system. The display system includes a display panel containing an array of display units, a plurality of stereoscopic devices coupled to the display panel to effect three-dimensional (3D) display, and a controller. The controller is configured to receive a 3D image to be displayed on the array of display units, where the 3D image contains a left image and a right image and the display units contain left display units for the left image and right display units for the right image. The controller is also configured to determine original display values for the display units to display the 3D image, to determine a coupling relationship between the display units and the stereoscopic devices, and to determine a crosstalk condition based on the coupling relationship between the display units and the stereoscopic devices. Further, the controller is configured to adjust the original display values of display units based on the coupling relationship, the crosstalk condition, and the original display values of both the left display units and the right display units such that the crosstalk condition is cancelled. The controller is also configured to display the 3D image using the adjusted display values of the display units.

Other aspects of the present disclosure can be understood by those skilled in the art in light of the description, the claims, and the drawings of the present disclosure.

DETAILED DESCRIPTION

Reference will now be made in detail to exemplary embodiments of the invention, which are illustrated in the accompanying drawings. Wherever possible, the same reference numbers will be used throughout the drawings to refer to the same or like parts.

Figure 1:
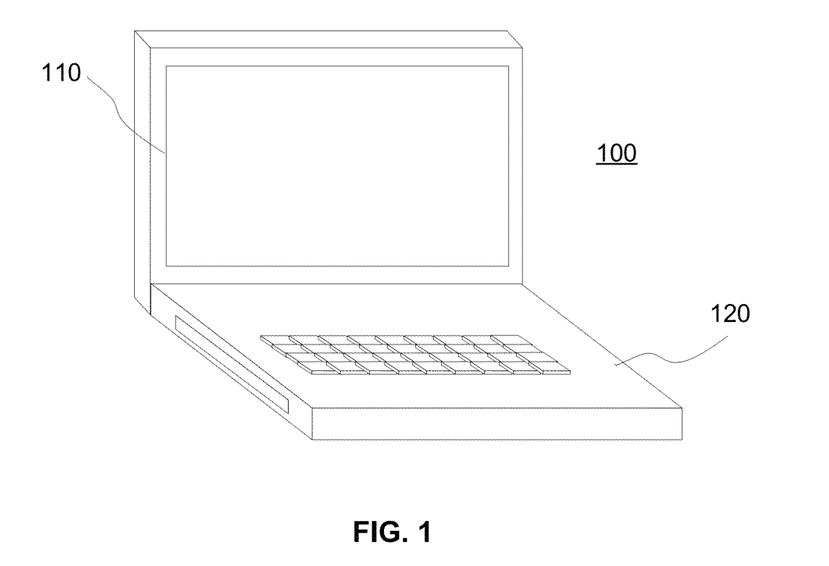
FIG. 1 illustrates an exemplary stereoscopic display system consistent with the disclosed embodiments.

FIG. 1 illustrates an exemplary environment incorporating certain aspects of the invention. As shown in FIG. 1, a three-dimensional (3D) display system 100 may include a 3D display device 110 and a base 120. The 3D display system 100 may include any appropriate system that is capable of processing and displaying two-dimensional (2D) or 3D images, such as a computer, a television set, a smart phone, or a consumer electronic device. Although 3D display system 100 is shown as a notebook computer, any device with computing power may be used.

The 3D display device 110 may include any appropriate type of 3D display screen based on plasma display panel (PDP) display, field emission display (FED), cathode ray tube (CRT) display, liquid crystal display (LCD), organic light emitting diode (OLED) display, or other types of displays. Further, 3D display device 110 may also be touch-sensitive, i.e., a touch screen. Other display types may also be used.

Figure 2:
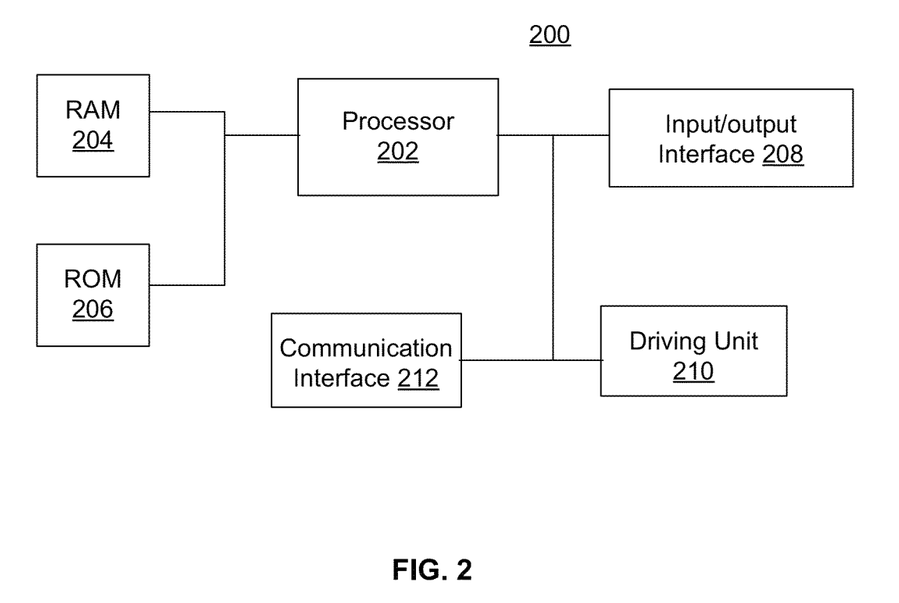
FIG. 2 illustrates a block diagram of a controller consistent with the disclosed embodiments.

Base 120 may include any appropriate structures and components to support operations of 3D display system 100. For example, base 120 may include a controller to control operation of 3D display device 110. FIG. 2 illustrates an exemplary controller consistent with the disclosed embodiments.

As shown in FIG. 2, controller 200 may include a processor 202, a random access memory (RAM) unit 204, a read-only memory (ROM) unit 206, an input/output interface unit 208, a driving unit 210, and a communication interface 212. Other components may be added and certain devices may be removed without departing from the principles of the disclosed embodiments.

Processor 202 may include any appropriate type of graphic processing unit (GPU), general-purpose microprocessor, digital signal processor (DSP) or microcontroller, and application specific integrated circuit (ASIC), etc. Processor 202 may execute sequences of computer program instructions to perform various processes associated with display system 100. The computer program instructions may be loaded into RAM 204 for execution by processor 202 from read-only memory 206 to process various 3D images.

Input/output interface 208 may be provided for users to input information into 3D display system 100 or for the users to receive information from 3D display system 100. For example, input/output interface 208 may include any appropriate input device, such as a remote control, a keyboard, a mouse, an electronic tablet, a voice communication device, or any other optical or wireless input device. Further, driving unit 210 may include any appropriate driving circuitry to drive various devices, such as 3D display device 110.

Further, communication interface 212 may provide communication connections such that controller 200 may be accessed by and/or communicate with other processors or systems through computer networks or other communication links via various communication protocols, such as transmission control protocol/internet protocol (TCP/IP) and hyper text transfer protocol (HTTP).

Figure 3A:
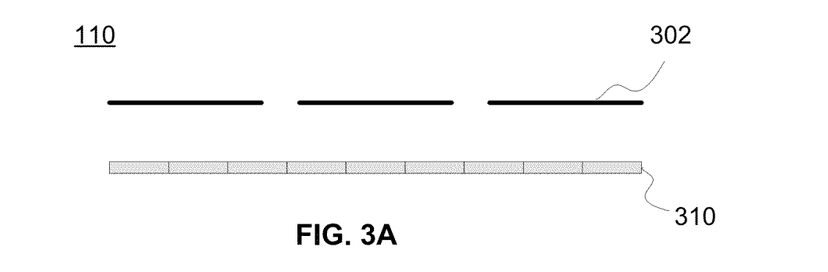
FIGS. 3A-3B illustrate an exemplary 3D display device consistent with the disclosed embodiments.

FIG. 3A shows an exemplary parallax-barrier 3D display device 110. As shown in FIG. 3A, a parallax barrier device 302 is placed next to a display panel or screen 310 with a closely coupled configuration. As described above, the display screen 310 may be a PDP display, FED, CRT display, LCD, OLED display, or other types of flat panel displays. The plurality of parallax barriers 302 may be placed on top of the display screen 310 or below the display screen 310.

Figure 3B:
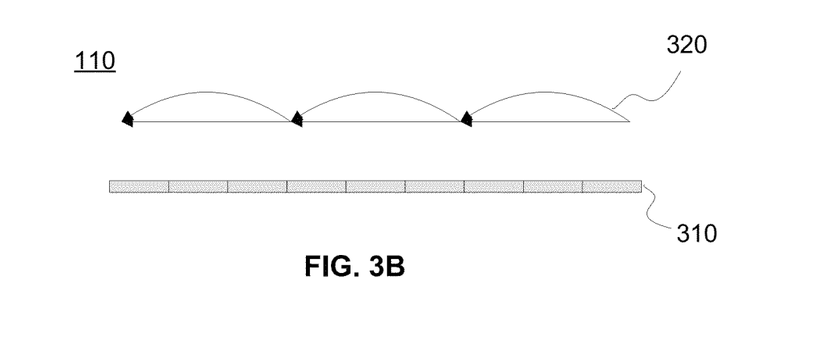

Alternatively, FIG. 3B shows an exemplary lenticular-lens 3D display device 110. As shown in FIG. 3B, lenticular lens device 320 may be placed on top of the display screen 310 or below the display screen 310 to form the 3D display device 110, also with a closely coupled configuration. Although parallax barriers 302 and lenticular lens 320 are used for illustrative purposes, any appropriate type of spectroscopic or light separation device may be used. Further, to simplify the illustrations, lenticular lens 320 are used in this disclosure as the stereoscopic device or the light separation device used in the 3D display device 110.

Figure 4:
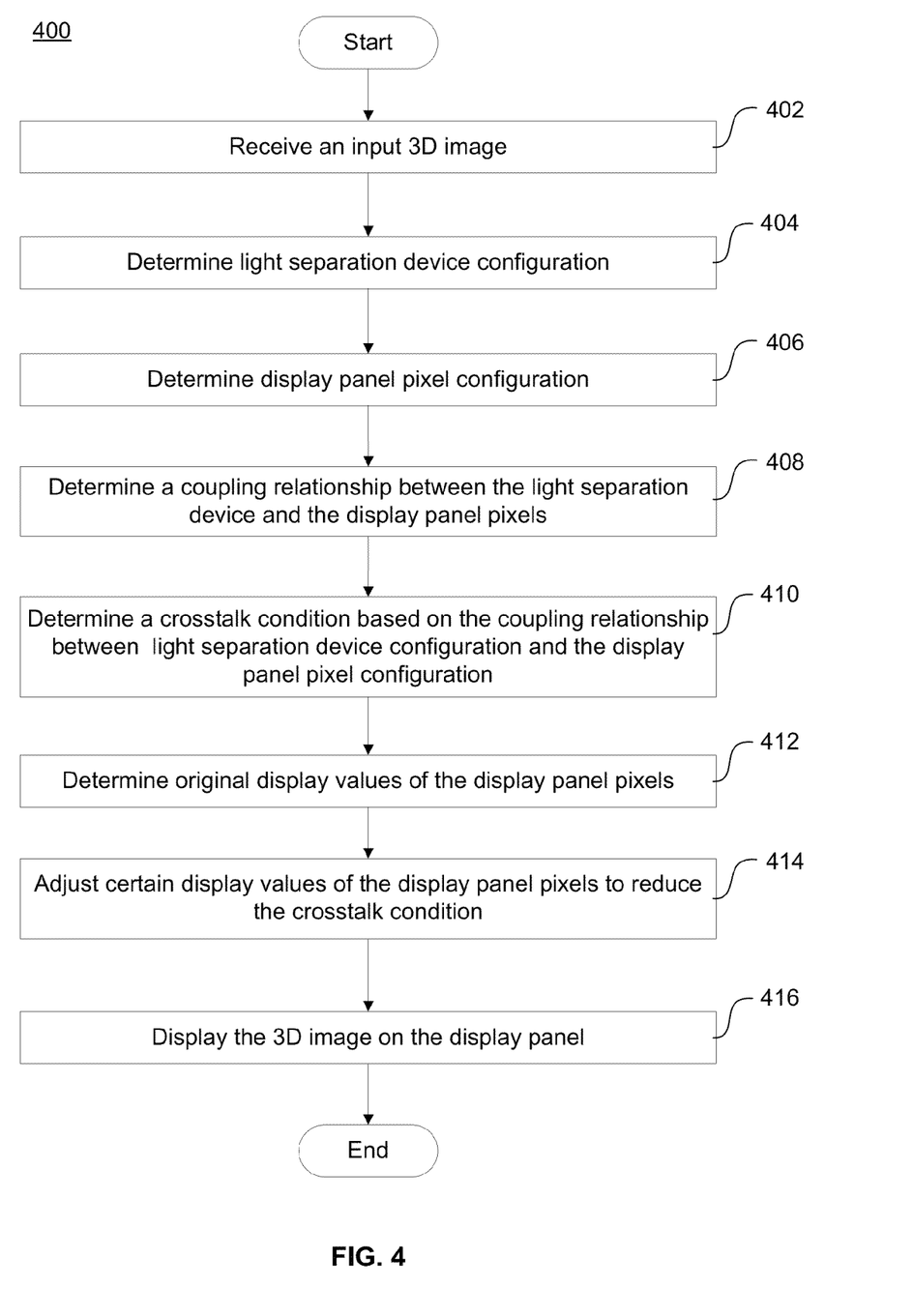
FIG. 4 illustrates an exemplary operation process consistent with the disclosed embodiments.

During operation, 3D display system 100 (e.g., processor 202) may perform certain processes to display 3D images. FIG. 4 illustrates an exemplary operation process 400 consistent with the disclosed embodiments.

As shown in FIG. 4, at the beginning of process 400, 3D display system 100 may receive a 3D image to be displayed (402). The 3D display system 100 may receive the input 3D image from any appropriate source, such as an internal storage, an external storage, a network source, or a broadcasting source, etc. A 3D image may include two or more view images. For example, a 3D image may include a left image and a right image, or may include more than two left images and more than two right images.

If the 3D display system 100 does not have configuration information about the light separation device used in the 3D display device 110, the 3D display system 100 may first determine the light separation device configuration (404). For example, 3D display system 100 may determine what type of the light separation device and dimensional and position information of the light separation device. In one embodiment, the 3D display system 100 may determine that the light separation device is a lenticular lens device 320 including a plurality lenticular lens with specific length and width of individual lenticular lens, and the angle between the lenticular lens and x-axis or y-axis of the display screen 310. A lenticular lens may also refer to as an individual stereoscopic device or individual light separation device.

Further, if 3D display system 100 does not have the configuration information of the display panel pixels or sub-pixels, the 3D display system 100 may determine the pixel or sub-pixel configuration of the display panel 310 (406).

Display panel 310 may comprise pixels that are arranged in a regular two-dimensional grid. Further, the pixel grid may be divided into single-color regions that contribute to displayed color when viewed at a distance, and each single-color region may be referred to as a sub-pixel. Thus, a pixel may include more than one sub-pixels. For example, a pixel of display panel 320 may include three (red, green, and blue) sub-pixels that can be separately addressed to display an image element. For illustrative purposes, pixels and sub-pixels may be used interchangeably and may be referred as display units.

The 3D display system 100 may determine the dimensional and position information of the pixels and/or sub-pixels of display panel 320. Further, the 3D display system 100 may determine a coupling relationship between the light separation device (e.g., lenticular lens 320) and the display panel pixels (408).

For example, based on the configuration information of the lenticular lens device 320 and the configuration information of the display panel 310, the 3D display system 100 may determine how many pixels or sub-pixels are covered by each lenticular lens and/or the angle between the lenticular lens and the pixel columns, etc.

The coupling relationship may impact display quality of the 3D image. For example, for a particular light separation or spectroscopic device, a less number of the display pixels may generate a clearer 3D image display, but the stereoscopic viewing area may be relatively small. On the other hand, if a greater number of the display pixels is used, a wider viewing area may be obtained, but the image clarity may be reduced.

Figure 5A:
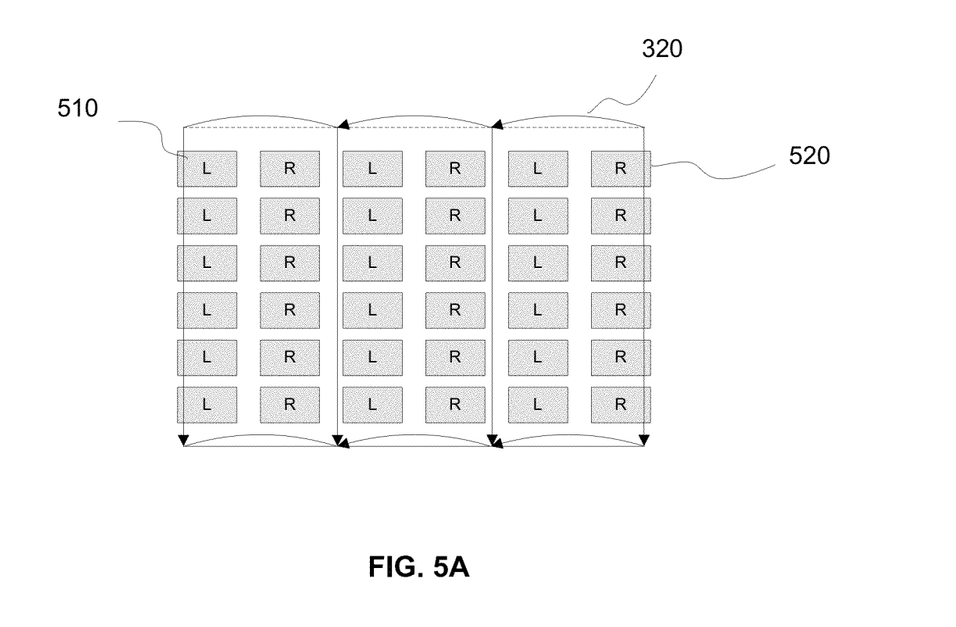
FIGS. 5A-5C illustrate exemplary configurations of the 3D display device consistent with the disclosed embodiments.
Figure 5B:
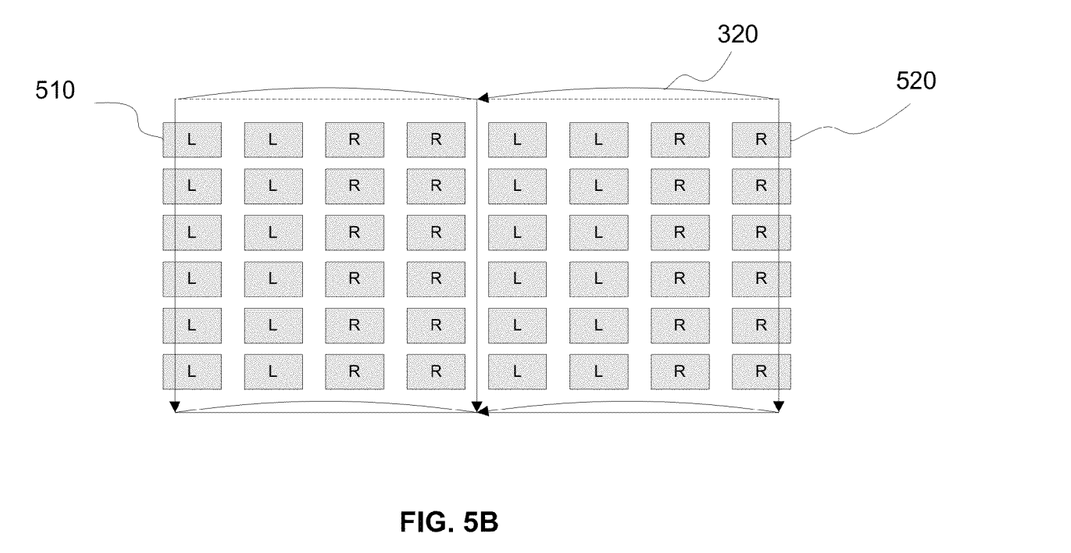
Figure 5C:
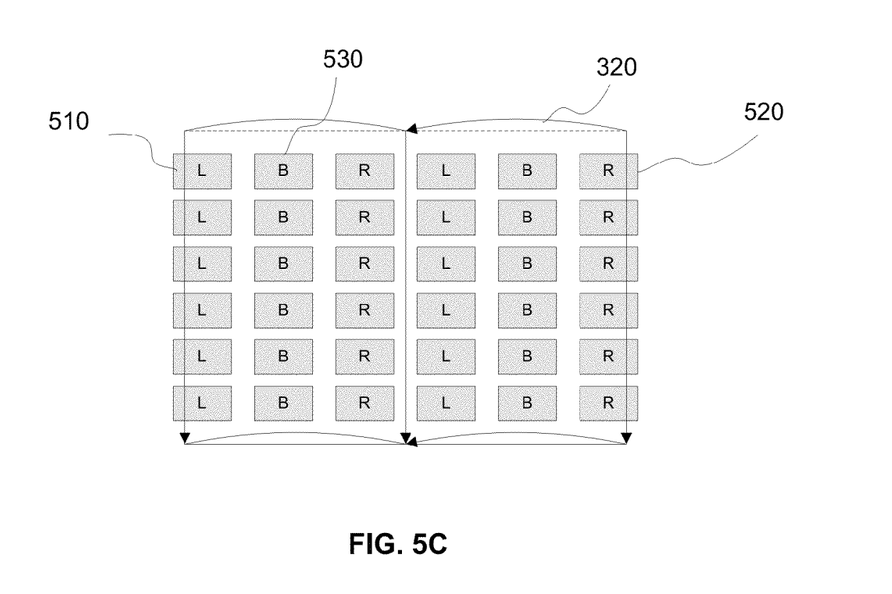

FIGS. 5A-5C illustrates an exemplary configuration of the lenticular lens and pixels. As shown in FIG. 5A, two columns of pixels or sub-pixels are covered by a single lenticular lens. That is, each lenticular lens of the lenticular lens device 320 covers a column of left image pixel 510 and a column of right image pixel 520, horizontally. The left image pixel and the right image pixel may refer to an individual pixel for an image viewable to the left eye (a left image) and an individual pixel for a image viewable to right eye (a right image), respectively. The 3D image includes the left image and the right image.

As shown in FIG. 5B, four columns of pixels or sub-pixels are covered by a single lenticular lens. That is, each lenticular lens of the lenticular lens device 320 covers two columns of left image pixels 510 and two columns of right image pixels 520, horizontally. Other configurations may also be used.

The configurations in both FIG. 5A and FIG. 5B use even-number of columns of pixels corresponding to a single lenticular lens. However, an odd number of columns of pixels may also be used.

As shown in FIG. 5C, three columns of pixels or sub-pixels are covered by a single lenticular lens. That is, each lenticular lens of the lenticular lens device 320 covers one column of left image pixel 510, one column of right image pixel 520, and one column of spare or blank pixel 530. Other configurations may also be similarly used.

After determining the coupling relationship between the light separation device configuration and the display panel pixel configuration (408), the 3D display system 100 may determine a crosstalk condition based on the coupling relationship between the light separation device configuration and the display panel pixel configuration (410).

The crosstalk condition, as used herein, may refer to a condition in which light from the left image pixels and light from the right image pixels cannot completely separated by the light separation device such that a portion of the light from the left image pixels goes into the right eye of the viewer and a portion of the light from the right image pixels goes into the left eye of the viewer. More particularly, the crosstalk condition may indicate which pixels may contribute to the crosstalk.

For example, for even number of columns of pixels, the 3D display system 100 may determine that the left pixels contribute to the crosstalk and the right pixels also contribute to the crosstalk, and that the left pixels and the right pixels contribute evenly or symmetrically. For odd number of columns of pixels, the 3D display system 100 may determine that the blank pixel may contribute to the crosstalk, differently from the left pixel and the right pixel. Any appropriate crosstalk condition determination method may be used.

The 3D display system 100 may also determine original display values of the display pixels or display units for displaying the 3D image (412). That is, to display the 3D image, display values, such as brightness or intensity, of the display pixels are obtained from image processing units.

Further, the 3D display system 100 may adjust certain display values of the display pixels or display units to reduce the crosstalk condition (414). That is, before displaying the 3D image using the display units, the display values for the display units are adjusted first. For example, the 3D display system 100 may adjust an intensity of the display panel pixels based on the coupling relationship between the light separation device and the display panel pixels and the cross-talk condition.

For example, when an even number of display pixels are used, e.g., as the display pixels shown in FIG. 5A, the intensity of a left pixel is denoted as 'L' and the intensity of a right pixel is denoted as 'R'. Based on the crosstalk condition, a portion of contents (with a ratio of '$\alpha$') of a left pixel may enter into a viewing area for a right pixel and, at the same time, a portion of contents (also with a ratio '$\alpha$' because of the symmetric arrangement of the left pixels and right pixels) of a right pixel may enter into a viewing area for a left pixel. The ratio of '$\alpha$' may also be referred as a crosstalk ratio, indicating the degree of crosstalk between the left pixel and the right pixel.

Thus, the intensity of the light from the left pixel entering into the viewing area of the left pixel is (L−$\alpha$*L), '*' is the multiplication operator, and the intensity of the light from the right pixel entering into the viewing area of the left pixel is ($\alpha$*R). Similarly, the intensity of the light from the right pixel entering into the viewing area of the right pixel is (R−$\alpha$*R), and the intensity of the light from the left pixel entering into the viewing area of the right pixel is ($\alpha$*L).

To adjust for such crosstalk condition, the 3D display system 100 may adjust the intensity of the left pixels and the right pixels in advance, before the pixels are displayed based on the original intensity. For example, the 3D display system 100 may adjust the intensity of the left pixel as (M*L−N*R) and the intensity of the right pixel as (M*R−N*L), where 'M' and 'N' are coefficients.

Then, the intensity of the light from the left pixel entering into the viewing area of the left pixel is ((M*L−N*R)−$\alpha$*(M*L−N*R)), and the intensity of the light from the right pixel entering into the viewing area of the left pixel is ($\alpha$*(M*R−N*L)). Similarly, the intensity of the light from the right pixel entering into the viewing area of the right pixel is ((M*R−N*L)−$\alpha$*(M*R−N*L)), and the intensity of the light from the left pixel entering into the viewing area of the right pixel is ($\alpha$*(M*L−N*R)).

The total intensity of the viewing area for the left pixel and the total intensity of the viewing area for the right pixel satisfy the following equation:

$$(M*R-N*L)*\alpha + (M*L-N*R) = L;$$

$$(M*L-N*R)*\alpha + (M*R-N*L) = R;$$

That is, by pre-adjusting the intensity of the left pixel in view of the intensity of the right pixel and pre-adjusting the intensity of the right pixel in view of the intensity of the left pixel, the crosstalk in the viewing area of the left pixel and the crosstalk in the viewing area of the right pixel are cancelled such that the original values of 'L' and 'R' can be viewed by the left eye and the right eye of the viewer. The equations can be solved as:

$$N = \frac{\alpha}{1-\alpha^2}$$

$$M = \frac{N}{\alpha} = \frac{1}{1-\alpha^2}$$

In practice, the value of '$\alpha$' may be a relative small number within the range of (0,1). The values for 'M' and 'N' may be determined based on various criteria. For example, for simplicity purpose, the values for 'M' and 'N' may be set as M=1.0, and N=$\alpha$. Or the values for 'M' and 'N' may be set as M=1.0+$\alpha$; and N=$\alpha$. Further, the values for 'M' and 'N' may also be set as M=1.0+$\beta$, N=$\alpha$, and $\alpha$ and $\beta$ are coefficients having close values, such as |$\beta$−$\alpha$|≤0.1, and 0≤$\alpha$≤0.3, 0≤$\beta$≤0.3. Other values for 'M' and 'N' may also be used.

Thus, when an even number of pixels are used corresponding to a lenticular lens (or a stereoscopic unit), the intensity of the left pixel can adjusted by multiplying the intensity of the left pixel by a greater-than-one factor then minus the intensity of the right pixel by a smaller factor, and the intensity of the right pixel can adjusted by multiplying the intensity of the right pixel by a greater-than-one factor then minus the intensity of the left pixel by a smaller factor. The crosstalk can then be significantly reduced or cancelled.

Figure 6A:
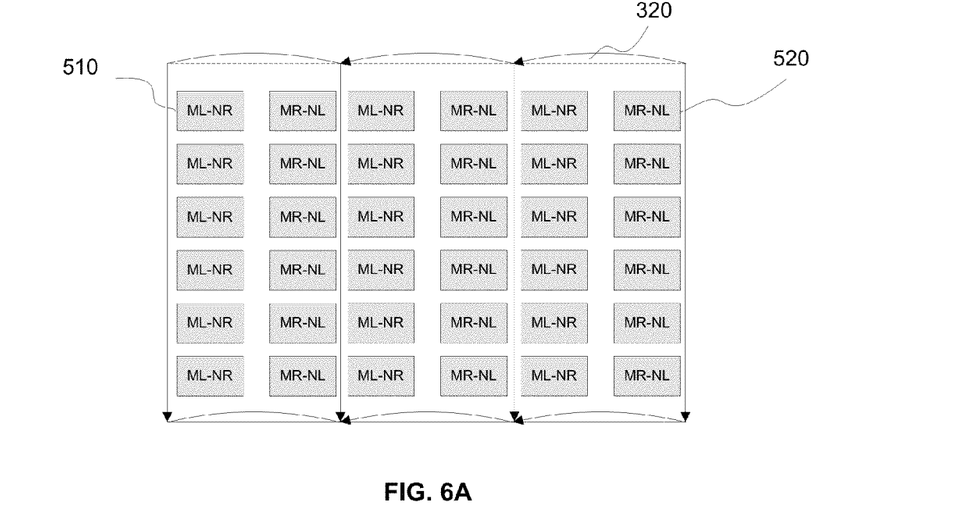
FIGS. 6A-6B illustrate display units adjustments for even-number of columns of display units configurations consistent with the disclosed embodiments.
Figure 6B:
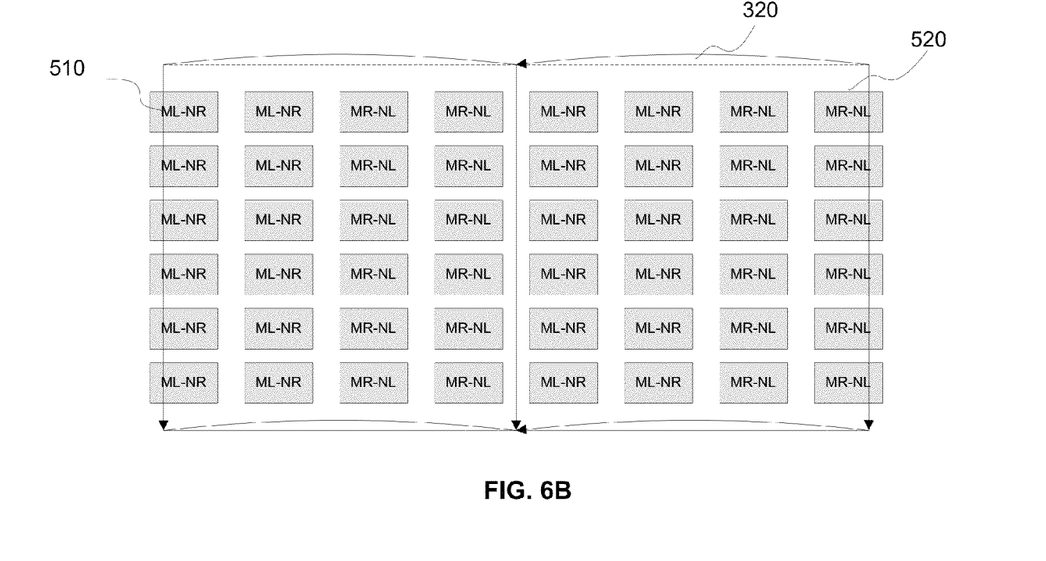

FIG. 6A and FIG. 6B illustrate adjusted left and right pixels consistent with the disclosed embodiments. As shown in FIG. 6A, corresponding to the pixel/lenticular lens configuration in FIG. 5A, one left pixel and one right pixel horizontally correspond to one lenticular lens, and the intensity of the left pixel and the right pixel is adjusted as $(M*L-N*R)$ and $(M*R-N*L)$, respectively. As shown in FIG. 6B, corresponding to the pixel/lenticular lens configuration in FIG. 5B, two left pixels and two right pixels correspond to one lenticular lens, and the intensity of the left pixels and the right pixels is adjusted as $(M*L-N*R)$ and $(M*R-N*L)$, respectively.

Returning to FIG. 4, on the other hand, when an odd number of display pixels are used, e.g., as the display pixels shown in FIG. 5C, it may be difficult to determine the intensity of the spare pixel (e.g., the middle pixel in a three-pixel configuration). For example, if the intensity of the spare pixel in the middle of the left pixel and the right pixel is set to '0', i.e., the pixel is black, the crosstalk between the left pixel and right pixel may be substantially reduced, because the left pixel and the right pixel are separated by the middle pixel. However, because the spare pixel is black, the intensity of the entire image may be reduced significantly. Further, such configuration may be cause obvious Moire phenomenon. On the other hand, when filing the spare pixel, both left pixel and right pixel may be affected by the crosstalk between the spare pixel and the left or right pixel. Thus, the spare pixel 'B' may also be referred as a crosstalk effect pixel. That is, the spare pixel 'B' may include any pixels between the left pixel(s) and the right pixel(s) and contributing or causing crosstalk to the left pixel(s) and the right pixel(s).

Figure 7:
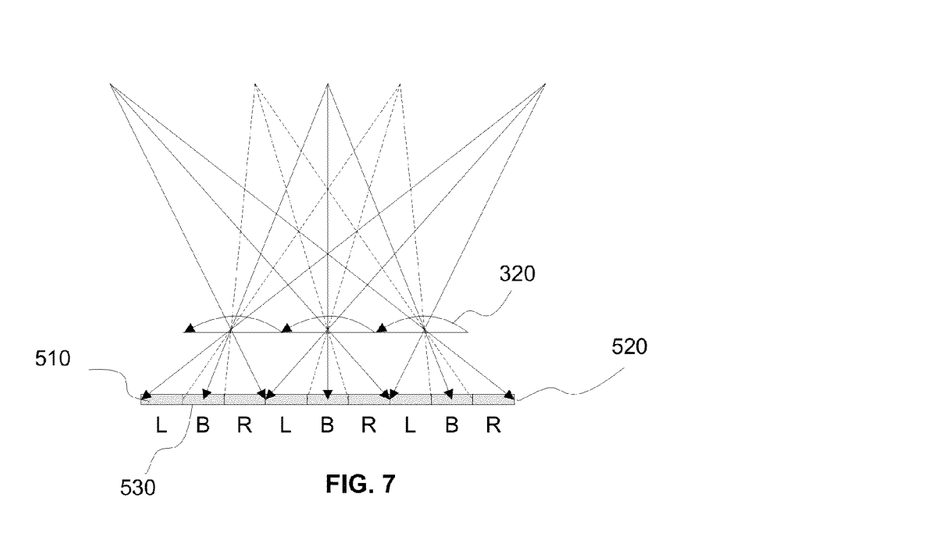
FIG. 7 illustrates an exemplary 3D display device configuration with an odd number of columns of display units consistent with the disclosed embodiments.

In certain embodiments, the intensity of the spare pixel 'B' may be configured as $(\gamma*L+\gamma*R)$, where '$\gamma$' is a coefficient. A portion of the light from the spare pixel 'B' may enter the viewing area for the left pixel 'L', and a portion of the light from the spare pixel 'B' may enter the viewing area for the right pixel 'R', as shown in FIG. 7.

More particularly, the portion of contents of the spare pixel 'B' into the areas of the left pixel 'L' and the right pixel 'R' may have the same ratio of '$\alpha$'. The ration '$\alpha$' may include any appropriate number. For example, the value of '$\alpha$' may be 0.5, i.e., half of the light of the spare pixel 'B' enters into the left image area and half of the light of the spare pixel 'B' enters into the right image area.

Figure 8:
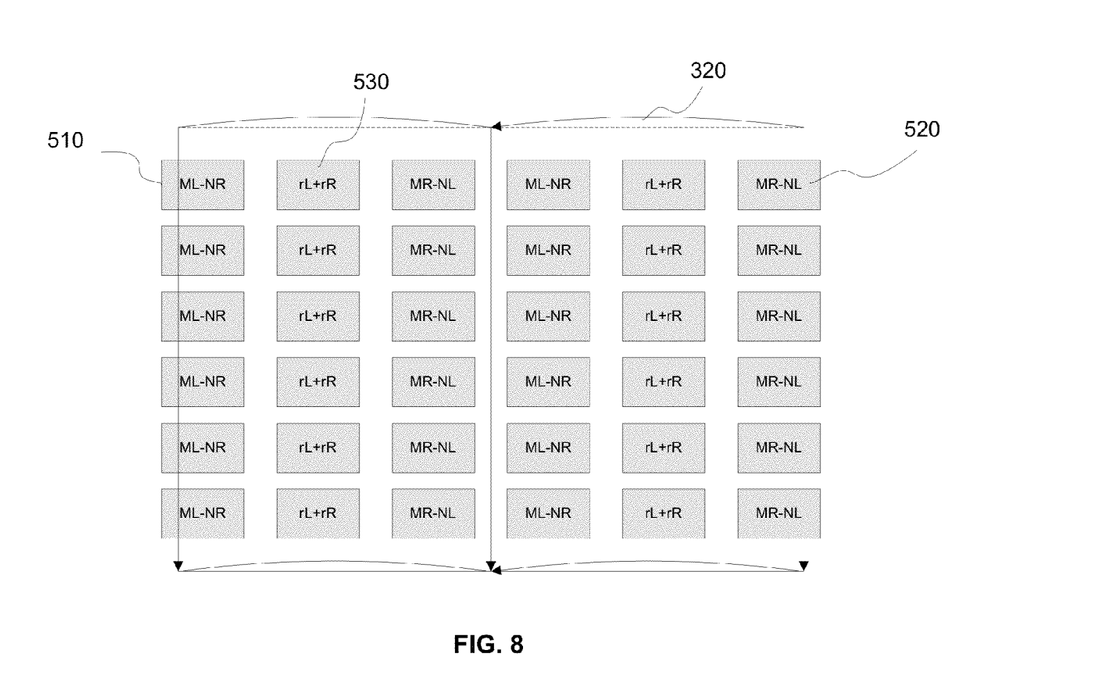
FIG. 8 illustrates display units adjustments for an odd-number of columns of display units configurations consistent with the disclosed embodiments.

Thus, the intensity for the left pixel in the left viewing area with the crosstalk is $(L+B/2)=(L+0.5 (\gamma*L+\gamma*R))$, which is equivalent to a crosstalk of $0.5\gamma*R$ from a right pixel into the total intensity $(L+0.5\gamma*L)$ of a left pixel. At the same time, the intensity for the right pixel in the right viewing area with the crosstalk is $(R+B/2)=(R+0.5 (\gamma*L+\gamma*R))$, which is equivalent to a crosstalk of $0.5\gamma*L$ from a left pixel into the total intensity $(R+0.5\gamma*R)$ of a right pixel. Thus, the intensity of the left pixel and the right pixel is adjusted to satisfy the equations as follows:

$(M*L-N*R)+0.5(\gamma*L+\gamma*R)=L+0.5\gamma*L;$ $(M*R-N*L)+0.5(\gamma*L+\gamma*R)=R+0.5\gamma*R;$ That is, the adjusted intensity of the left pixel and the right pixel cancels the crosstalk, as shown in FIG. 8. In other words, by pre-adjusting the intensity of the left pixel in view of the intensity of the right pixel, pre-adjusting the intensity of the right pixel in view of the intensity of the left pixel, and pre-setting the intensity of the spare pixel in view of the intensity of the left pixel and the right pixel, the crosstalk condition caused by the spare pixel can be cancelled. Solving the equations to get:

$M=1.0+0.5\gamma; N=0.5\gamma$

Taking into account the uniformity of the image intensity of the entire array of the display pixels or display units, the value of '$\gamma$' may be set as: $\gamma=0.5$. Thus, the values of 'M' and 'N' can be set as: $M=1.25, N=0.25$.

In this case, the crosstalk caused by the spare pixel 'B' may be significantly reduced. Further, other values of '$\gamma$' can also be used. For example, a smaller value of '$\gamma$' may be used to further reduce the crosstalk, while the value of '$\gamma$' also is set to higher than the threshold for causing the Moire phenomenon. In certain embodiments, the values of '$\gamma$' may be set as $0.3 \leq \gamma \leq 0.5$. Also, the value of M can be set as $M=1.0+\beta$, and $|\beta-$ of $0.5\gamma| \leq 0.1, 0 \leq \beta \leq 0.3$. Other configurations may also be used.

Although the intensity is used for illustrative purposes, other display values, such as power, color, brightness, and/or energy, etc., can be similarly used under appropriate circumstances. After the display values display panel pixels are adjusted to reduce or cancel the crosstalk condition (414), the 3D display system 100 may display the 3D image on the display panel (416).

Although only a single column of spare pixels 'B' is used to illustrate the crosstalk adjusting algorithms, more than one columns of spare pixels 'B' can be used. When a single column of spare pixels is used, the arrangement of the light separation device may be configured to position the single column of spare pixels in the middle of the light separation device. However, when more than one columns (e.g., 3, 5, etc.) of spare pixels 'B' are used, the middle column of the more-than-one columns may be positioned in the middle of the light separation device.

Further, when more than one columns of spare pixels 'B' are used, the pixel adjustment may be performed based on the above algorithms of a single column of spare pixels. Specifically, the display values of the left pixels and the right pixels, as well as a column of spare pixels (e.g., a middle column) may be calculated, as explained above. Further, the display values of the other columns of the spare pixels may be derived from the calculated column of spare pixels. For example, the display value of the calculated column of spare pixels may be assigned accordingly to the other columns of the spare pixels. Other methods may also be used.

By using the disclosed methods and systems, various stereoscopic image display applications may be implemented. The 3D images are pre-processed according to individual display units (e.g., pixels or sub-pixels) such that the display values of the individual display units are adjusted prior to actual display to avoid or significantly reduce crosstalk among the display units. In other words, by adjusting the display values of the display units, the crosstalk caused by other display units in the particular display unit can be cancelled, and thus the display quality can be improved.

Other applications, advantages, alternations, modifications, or equivalents to the disclosed embodiments are obvious to those skilled in the art.

What is claimed is:

1. A method for a stereoscopic display system having a display panel containing an array of display units and a plurality of stereoscopic devices coupled to the display panel to effect three-dimensional (3D) display, the method comprising:
receiving a 3D image to be displayed on the array of display units, the 3D image containing a left image and a right image and the display units containing left display units for the left image and right display units for the right image;
determining original display values for the display units to display the 3D image;
determining a coupling relationship between the display units and the stereoscopic devices;
determining a crosstalk condition based on the coupling relationship between the display units and the stereoscopic devices;
adjusting the original display values of display units based on the coupling relationship, the crosstalk condition, and the original display values of both the left display units and the right display units such that the crosstalk condition is cancelled; and
displaying the 3D image using the adjusted display values of the display units.

2. The method according to claim 1, wherein determining the coupling relationship further includes:
determining whether an even number of display units correspond to a stereoscopic device or an odd number of display units correspond to a stereoscopic device.

3. The method according to claim 2, wherein determining the crosstalk condition further includes:
when an even number of display units correspond to a stereoscopic device, determining the crosstalk condition as crosstalk between left display units and right display units; and
when an odd number of display units correspond to a stereoscopic device, determining the crosstalk condition as crosstalk between spare display units of the display units and the left display units and between the spare display units and the right display units.

4. The method according to claim 3, wherein adjusting the original display values of display units further includes:
when an even number of display units correspond to a stereoscopic device, adjusting the original display values of the left display units based on the original display values of the right display units, and adjusting the original display value of the right display units based on the left display units such that the crosstalk condition between the left display units and the right display units is cancelled.

5. The method according to claim 4, wherein the display unit is a display pixel and the display value is intensity of the display pixel, provided that the intensity of a left display pixel is L, the intensity of a right display pixel is R, and a crosstalk ratio between the left display pixel and the right display pixel is α, and adjusting the original display values of display units further includes:
determining coefficient $$N = \frac{\alpha}{1-\alpha^2}$$

and coefficient $$M = \frac{N}{\alpha}$$

$$= \frac{1}{1-\alpha^2};$$

adjusting the intensity of the left display pixel as (M*L−N*R); and
adjusting the intensity of the right display pixel as (M*R−N*L).

6. The method according to claim 5, wherein coefficient M and coefficient N are determined based on:

$$(M*R-N*L)*\alpha+(M*L-N*R)=L; \text{ and}$$

$$(M*L-N*R)*\alpha+(M*R-N*L)=R.$$

7. The method according to claim 5, wherein:
coefficient M is 1.0; and
coefficient N is α.

8. The method according to claim 3, wherein adjusting the original display values of display units further includes:
when an odd number of display units correspond to a stereoscopic device, setting display values of the spare display units based on the original display values of the left display units and the right display units, adjusting the original display values of the left display units based on the original display values of the right display units, and adjusting the original display value of the right display units based on the left display units such that the crosstalk condition between the spare display units and the left display units and the crosstalk condition between the spare display units and the right display units are cancelled.

9. The method according to claim 8, wherein the display unit is a display pixel and the display value is intensity of the display pixel, provided that the intensity of a left display pixel is L, the intensity of a right display pixel is R, γ is a coefficient, the intensity of a spare display pixel between the left display pixel and the right display pixel is B, and, adjusting the original display values of display units further includes:
setting the intensity of the spare display pixel B as B=(γ*L+γ*R);
determining coefficient M=1.0+0.5γ and coefficient N=0.5γ;
adjusting the intensity of the left display pixel as (M*L−N*R); and
adjusting the intensity of the right display pixel as (M*R−N*L).

10. The method according to claim 9, wherein coefficient M and coefficient N are determined based on:

$$(M*L-N*R)+0.5(\gamma*L+\gamma*R)=L+0.5\gamma*L; \text{ and}$$

$$(M*R-N*L)+0.5(\gamma*L+\gamma*R)=R+0.5\gamma*R.$$

11. The method according to claim 9, wherein
coefficient γ is 0.5
coefficient M is 1.25; and
coefficient N is 0.25.

12. A stereoscopic display system, comprising:
a display panel containing an array of display units,
a plurality of stereoscopic devices coupled to the display panel to effect three-dimensional (3D) display; and
a controller configured to:
receive a 3D image to be displayed on the array of display units, the 3D image containing a left image and a right image and the display units containing left display units for the left image and right display units for the right image;

determine original display values for the display units to display the 3D image;

determine a coupling relationship between the display units and the stereoscopic devices;

determine a crosstalk condition based on the coupling relationship between the display units and the stereoscopic devices;

adjust the original display values of display units based on the coupling relationship, the crosstalk condition, and the original display values of both the left display units and the right display units such that the crosstalk condition is cancelled; and display the 3D image using the adjusted display values of the display units.

13. The stereoscopic display system according to claim 12, wherein, to determine the coupling relationship, the controller is further configured to:

determine whether an even number of display units correspond to a stereoscopic device or an odd number of display units correspond to a stereoscopic device.

14. The stereoscopic display system according to claim 13, wherein, to determine the crosstalk condition, the controller is further configured to:

when an even number of display units correspond to a stereoscopic device, determine the crosstalk condition as crosstalk between left display units and right display units; and when an odd number of display units correspond to a stereoscopic device, determine the crosstalk condition as crosstalk between spare display units of the display units and the left display units and between the spare display units and the right display units.

15. The stereoscopic display system according to claim 14, wherein, to adjust the original display values of display units, the controller is further configured to:

when an even number of display units correspond to a stereoscopic device, adjust the original display values of the left display units based on the original display values of the right display units, and to adjust the original display value of the right display units based on the left display units such that the crosstalk condition between the left display units and the right display units is cancelled.

16. The stereoscopic display system according to claim 15, wherein the display unit is a display pixel and the display value is intensity of the display pixel, provided that the intensity of a left display pixel is L, the intensity of a right display pixel is R, and a crosstalk ratio between the left display pixel and the right display pixel is $\alpha$ and, to adjust the original display values of display units, the controller is further configured to:

determine coefficient $$N = \frac{\alpha}{1-\alpha^2}$$

and coefficient $$M = \frac{N}{\alpha}$$
$$= \frac{1}{1-\alpha^2};$$

adjust the intensity of the left display pixel as (M*L−N*R); and adjust the intensity of the right display pixel as (M*R−N*L).

17. The stereoscopic display system according to claim 16, wherein coefficient M and coefficient N are determined based on:

(M*R−N*L)*α+(M*L−N*R)=L; and (M*L−N*R)*α+(M*R−N*L)=R.

18. The stereoscopic display system according to claim 14, wherein, to adjust the original display values of display units, the controller is further configured to:

when an odd number of display units correspond to a stereoscopic device, set display values of the spare display units based on the original display values of the left display units and the right display units, to adjust the original display values of the left display units based on the original display values of the right display units, and to adjust the original display value of the right display units based on the left display units such that the crosstalk condition between the spare display units and the left display units and the crosstalk condition between the spare display units and the right display units are cancelled.

19. The stereoscopic display system according to claim 18, wherein the display unit is a display pixel and the display value is intensity of the display pixel, provided that the intensity of a left display pixel is L, the intensity of a right display pixel is R, $\gamma$ is a coefficient, the intensity of a spare display pixel between the left display pixel and the right display pixel is B, and, to adjust the original display values of display units, the controller is further configured to:

set the intensity of the spare display pixel B as B=(γ*L+γ*R);

determine coefficient M=1.0+0.5γ and coefficient N=0.5γ;

adjust the intensity of the left display pixel as (M*L−N*R); and adjust the intensity of the right display pixel as (M*R−N*L).

20. The stereoscopic display system according to claim 19, wherein coefficient M and coefficient N are determined based on:

(M*L−N*R)+0.5(γ*L+γ*R)=L+0.5γ*L; and (M*R−N*L)+0.5(γ*L+γ*R)=R+0.5γ*R.

* * * * *